United States Patent [19]
Calistrat

[11] 3,953,986
[45] May 4, 1976

[54] PERMANENTLY SEALED GEAR COUPLING

[75] Inventor: Michael M. Calistrat, Sykesville, Md.

[73] Assignee: Koppers Company, Inc., Pittsburgh, Pa.

[22] Filed: Dec. 23, 1974

[21] Appl. No.: 535,876

[52] U.S. Cl. .................................. 64/9 R; 64/32 R
[51] Int. Cl.² ........................................... F16D 3/18
[58] Field of Search................... 64/9 R, 9 A, 14, 32

[56] References Cited
UNITED STATES PATENTS

| | | | |
|---|---|---|---|
| 1,961,426 | 6/1934 | Morgan................................ | 64/9 R |
| 2,891,393 | 6/1959 | Swanson .............................. | 64/9 R |
| 3,343,376 | 9/1967 | Carman................................ | 64/9 R |
| 3,638,453 | 2/1972 | Ehret .................................... | 64/9 R |

FOREIGN PATENTS OR APPLICATIONS

| | | | |
|---|---|---|---|
| 1,020,838 | 10/1953 | Germany.............................. | 64/9 R |

*Primary Examiner*—Samuel Scott
*Assistant Examiner*—Randall Heald
*Attorney, Agent, or Firm*—Oscar B. Brumback; Boyce C. Dent

[57] ABSTRACT

A permanently sealed gear coupling for connecting a pair of substantially coaxially aligned rotatable shafts comprising a hub connected to each of the rotatable shafts, each of the hubs including outwardly extending spur gear teeth projecting from a portion of the outer surface thereof; a sleeve surrounding and radially spaced from each of the hubs, the sleeve having inwardly extending spur gear teeth in meshing engagement with the outwardly extending gear teeth on each hub; and permanently mounted sealing rings for retaining lubricant in spaces between the hubs and the sleeve for lubricating the meshing gear teeth.

6 Claims, 1 Drawing Figure

U.S. Patent  May 4, 1976  3,953,986
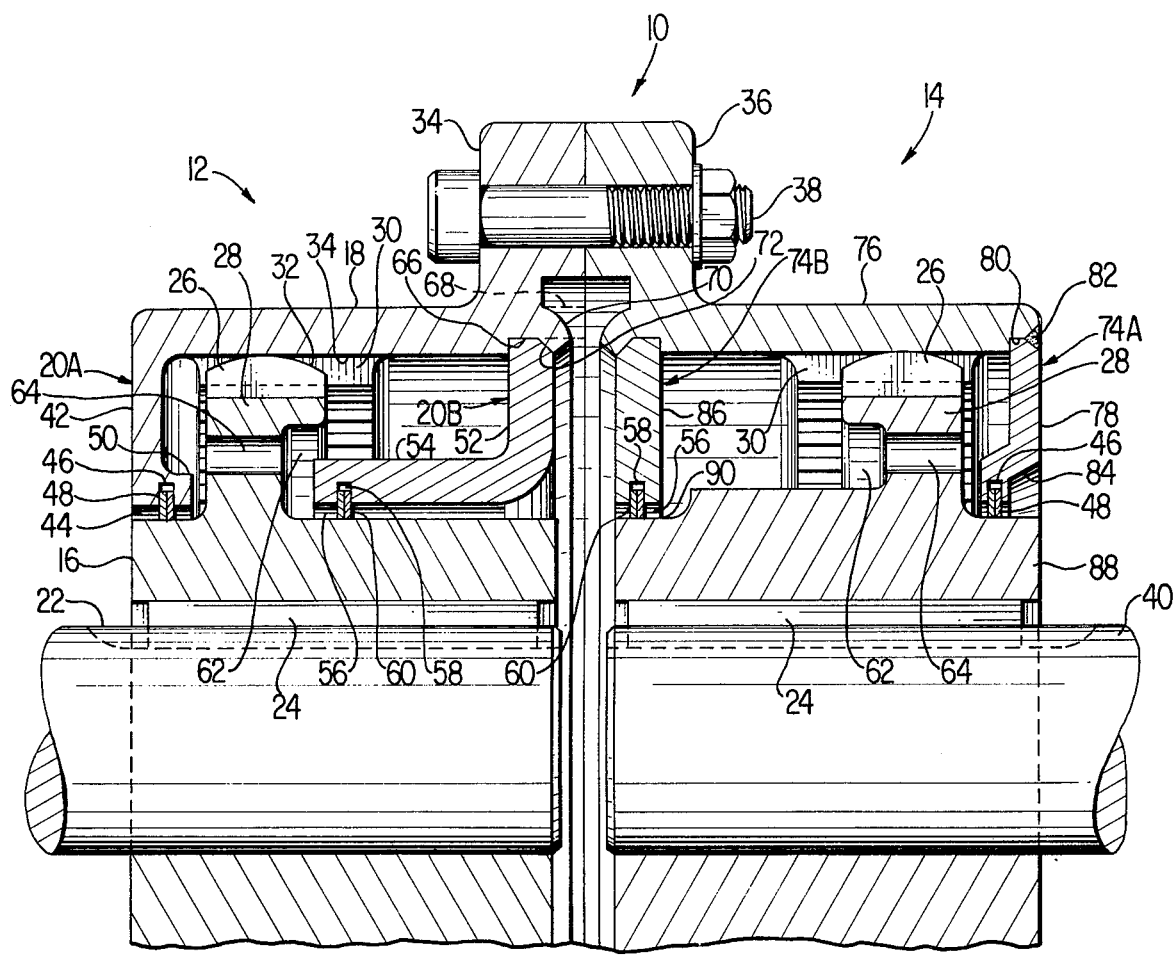

PERMANENTLY SEALED GEAR COUPLING

BACKGROUND OF THE INVENTION

1. Field of the Invention

This invention relates generally to flexible shaft couplings having intermeshing teeth and more particularly to flexible gear couplings having means for permanently sealing a lubricant within the coupling for lubricating the intermeshing gear teeth.

2. Description of the Prior Art

Flexible gear couplings have been widely accepted in industry as a successful means for transmitting torque from a driving shaft to a substantially coaxially aligned driven shaft, particularly where high torque is to be transmitted between shafts that are radially and angularly misaligned. The construction and operation of such flexible gear couplings may be easily understood by reference to Fast U.S. Pat. No. 1,356,860 although many improvements have since been made to the basic design.

Since a typical gear coupling has meshing gear teeth, it is essential that the gear teeth be well lubricated at all times to prevent wear of the teeth. Lubrication of gear couplings has been a problem from their inception. Since gear couplings are used in a variety of applications, they are frequently removed from one pair of shafts and installed on other shafts or they may be stored in inventory for future use.

Typical gear couplings include two coupling halves bolted together to form a complete coupling although a single coupling half may be bolted to a flange on one of the shafts. One-half coupling is installed on each of the coaxially aligned shafts and the sleeves are bolted together to form a full coupling. When the half couplings are being installed, their ends are open and it is difficult to keep lubricant within the coupling, such lubricant usually being in liquid form although it may be a heavy grease. Many mechanics fail to replenish the lost lubricant. In addition, dirt, and grime may become mixed with the lubricant and damage the gear teeth causing premature failure of the coupling.

Another problem is that the lubricant must be of a special type to hold together and perform properly under the centrifugal forces inherent in a rotating coupling. There are very few lubricants that can be used in gear couplings. However, when the lubricant must be replenished, many mechanics use any lubricant that is available which may not maintain proper lubrication of the teeth.

In addition, it has been found that where the sleeves are connected a gasket must be used between the flanges to prevent leakage of the lubricant through the connection. However, under high centrifugal forces and temperatures the gasket may become weak, allowing the lubricant to seep between the flanges and out of the coupling.

Another problem with typical gear couplings is that the lubricant does not flow easily from one side of the meshing gear teeth to the other since it must flow through the spaces between the teeth. The spaces are very small and lubricant does not always reach all areas of the teeth if the lubricant remains on one side of the teeth.

Accordingly, an object of the invention is to provide a permanently sealed gear coupling that does not require periodic replacement of the lubricant. A further object is to provide means for applying lubricant to both sides of the gear teeth to enhance lubrication.

SUMMARY OF THE INVENTION

These and other objects and advantages are generally achieved by permanently sealing a lubricant within each coupling half of a full gear coupling and providing a flow path for the lubricant from one side of the teeth to the other.

Permanent sealing of lubricant within the coupling halves forming a complete gear coupling is accomplished by providing each coupling half with a hub, mounted on one of the shafts to be connected, having external gear teeth thereon surrounded by a sleeve surrounding the hub which has internal gear teeth thereon in meshing engagement with the hub external teeth, and permanently securing an annular flange to each end of the sleeve, such flanges including groove mounted flexible rings in engagement with the hub to retain the lubricant but at the same time permitting the hub to flex relative to the sleeve in the usual manner.

Lubricant flow within the coupling half is accomplished by providing openings in the raised shoulder portion of the hub in which the external gear teeth are formed. Thus, lubricant on one side of the teeth may flow to the other side during rotation of the coupling.

The above and further objects and novel features of the invention will appear more fully in the following detailed description when the same is read in connection with the accompanying drawing. It is to be expressly understood, however, that the drawing is not intended as a definition of the invention but is for the purpose of illustration only.

BRIEF DESCRIPTION OF THE DRAWING

In the drawing wherein like parts are marked alike:

The FIGURE is a side elevation in cross-section of the sealed gear coupling of the invention showing the preferred embodiment on the left hand side thereof and an alternate embodiment on the right hand side.

DESCRIPTION OF THE PREFERRED EMBODIMENT

Referring to the FIGURE, a full coupling, generally denoted by numeral 10, includes two half couplings 12 and 14 connected by their sleeve portions to form a full coupling.

The preferred construction shown as coupling half 12 includes a hub means 16, a sleeve means 18, and a sealing ring means of which the left portion is identified by numeral 20A and the right portion by numeral 20B.

Hub 16 is connected for rotation to a shaft 22 in a convenient manner such as by a conventional key and keyway arrangement 24. Hub 16 also includes conventional radially extending external spur gear teeth 26 thereon, preferably formed in an annular raised shoulder portion 28 extending from the main body portion of hub 16. Shoulder portion 28 is located so as to leave portions of hub 16 adjacent to sealing rings 20A and 20B as shown in the FIGURE.

Sleeve 18 surrounds hub 16 and includes conventional radially extending internal spur gear teeth 30 thereon which mesh in the well known manner with hub teeth 26. Internal teeth 30 are preferably axially longer than external teeth 26 so that hub 16 may be positioned or moved axially relative to sleeve 18 without the teeth becoming disengaged. The top lands 32 of external teeth 26 may be axially arcuate or crowned to provide tangential contact with the bottom lands 34 of straight internal teeth 30. This arrangement provides piloting of the hub 16 within sleeve 18, that is, hub 16 may be pivoted axially with respect to sleeve 18 but at the same time remain in snug radial engagement with sleeve 18 as well understood by those skilled in the art.

Sleeve 18 also includes a mounting flange 34 for rigidly connecting sleeve 18 to a similar flange 36 on the adjacent half coupling 14. A fastening means 38 such as an ordinary bolt and nut secures the flanges 34 tightly together. It should be understood that flange 36 may be a part of a rigid hub (not shown), of conventional construction (similar to that shown in Carman U.S. Pat. No. 3,343,376), secured to the adjacent coaxially aligned shaft 40, such arrangement essentially connecting sleeve 18 to the shaft 40. Thus, half coupling 12 connects shafts 22 and 40 for rotation. However, two half couplings, such as 12 and 14, may be used to increase the capacity of the coupling to compensate for larger amounts of angular and off-set misalignment. It should also be understood that both half couplings should be substantially identical when two half couplings are used to form a full coupling 10. The half coupling 14 is different from half coupling 12 merely to illustrate another embodiment as will be subsequently explained.

The preferred construction of the sealing means is shown in connection with half coupling 12 wherein the left portion 20A comprises a first annular flange 42 formed integrally with the outer end of sleeve 18 so as to define an annular space 44 with the hub 16 adjacent the outer side of teeth 26 on the shoulder portion 28. The annular flange 42 includes a circumferentially extending groove 46 in which a flexible sealing ring member 48 is seated to close the annular space 44 between hub 16 and flange 42. Ring 48 is preferably formed as a split coiled ring member with circumferentially overlapping coils. The inner diameter of the ring, in its free state, is slightly less than the diameter of the hub 16 against which it bears when assembled as shown in the FIGURE. Radial expansion of the ring 48 upon assembly results in it bearing against hub 16 and, in conjunction with its being seated snugly in groove 46, seals the interior of the coupling half and retains lubricant therein as will be explained. It can also be seen that this arrangement permits the ring 48 to displace slightly in the radial direction when shaft 22 is angularly misaligned with respect to the axis of sleeve 18 as usually occurs during operation. Ring 48 is commercially available from the Ramsey Corporation, St. Louis, Mo. under the trademark Spirolox. A full explanation of its construction and operation appears in the Carman patent, supra.

Annular flange 42 includes an axially extending lip portion 50 which serves as a stop to limit axial movement of sleeve 18 to the right, as shown in the FIGURE, when the sleeve is permitted to float as when it is connected to another half coupling 14. Lip portion 50 also permits groove 46 to be made closer to the side of shoulder portion 28; this limits the amount of deformation of ring 48 from angular misalignment of hub 16.

The right hand portion 20B of the sealing means comprises a second annular flange 52 permanently secured to the inner end of sleeve 18. Flange 52 includes a cylindrical portion 54 extending axially towards the inner side of the external teeth 26 on shoulder 28 and defines a second annular space 56 with the hub 16 adjacent the inner side of shoulder 28. A circumferentially extending groove 58, identical to groove 46, is formed near the end of cylindrical portion 54. A flexible sealing ring 60, identical to ring 48, is seated in groove 58 and bears resiliently against hub 16 as shown to close the annular space 56 between hub 16 and cylindrical portion 54. Shoulder portion 28 includes an annular recess 62, formed as shown, for receiving the end of cylindrical portion 54. This permits the sealing ring 60 to be placed in groove 58 near the side of teeth 26 on shoulder 28 which limits the deformation of ring 60 from angular misalignment of hub 16 as previously explained with respect to ring 48. The end of cylindrical portion 54 also serves as a stop against movement of sleeve 18 to the left such as was explained with respect to lip portion 50.

Thus, it can be seen that the sealing ring means 20A and 20b, including flexible sealing rings 48 and 60, enclose the 20B, between hub 16 and sleeve 18 so that lubricant placed within the space is retained therein. However, the space on the left side of shoulder portion 28 is substantially isolated from the space on the right since the external teeth 26 mesh closely with the internal teeth 30 in the conventional manner. Therefore, shoulder portion 28 includes at least one and preferably several axially extending openings extending therethrough at circumferentially spaced intervals around the shoulder to permit passage of lubricant freely from one side of the shoulder to the other. Thus, as the coupling rotates, centrifugal force will urge lubricant outwardly along both sides of teeth 26 where it will easily flow within the meshing teeth to maintain adequate lubrication thereof.

Although the annular flange 52 of sealing means 20B may be secured to sleeve 18 such as by screws (not shown) or other conventional fastening means, in accordance with this invention, flange 52 is permanently secured to sleeve 18. This is done so that the proper lubricant may be placed within the coupling half 12 by the manufacturer and, being permanently sealed therein by sealing means 20A and 20B, need not be replaced or replenished during the life of the coupling. In addition, the coupling half 12 may be removed from shaft 22, stored if necessary, and reused without loss of lubricant.

Flange 52 may be permanently secured to sleeve 18 by adhesive bonding, by press fitting it within the bore of sleeve 18, or by welding it in place, all in accordance with this invention. If welded, care must be taken not to evaporate the lubricant placed within the coupling prior to installing flange 52. However, the preferred manner of securing the flange 52 to sleeve 18 is to initially form the sleeve with an internal shoulder portion 66 and a relatively thin annular ring portion 68 as shown by the dotted lines in the FIGURE. After the flange 52 is seated in the shoulder portion 66, ring portion 68 is deformed into tight engagement with the flange 52 such as by peening, rolling, or swaging it in the conventional manner to form the final annular ring portion 70. This construction is simplified by providing a chamfer 72 on flange 52 against which ring portion 68 is engaged. In the event that it is necessary to remove flange 52, ring portion 70 may be forced open to do so; it may again be deformed to re-install flange 52.

The coupling half 14 is similar to coupling half 12 except for a different construction of the sealing means and similar parts bear the same numbers as those in coupling half 12. In this construction, the right-hand or outer sealing ring portion 74A is not formed integrally with the sleeve means 76 but, instead, comprises an annular plate 78 that is permanently secured to sleeve 76. An annular internal shoulder 80 is provided in sleeve 76 within which plate 78 is seated. Plate 78 may be secured to sleeve 76 by adhesive bonding or by a press fit between the parts but is preferably welded in place by a weld 82.

Plate 78 may otherwise be made exactly like flange 42 of sealing ring 42 previously described, that is, with a lip portion 50 having a groove 46 therein and so on. However, it may be formed with an axially offset portion 84 as shown in the FIGURE which functions in the same manner as does flange 42.

The left hand or inner sealing ring portion 74B in coupling half 14 comprises a flat annular plate 86 permanently secured to sleeve 76 in the same manner as described for securing flange 52 to sleeve 18. But, plate 86 does not include an inturned cylindrical portion for supporting the flexible ring 60; instead, it extends radially towards hub 88 where ring 60 closes the annular space 56 defined by plate 86 with hub 88. Hub 88 includes an annular shoulder portion 90 to provide a stop for limiting axial movement of sleeve 76 to the right since plate 86 is too far from annular shoulder 28 to act as a stop. It should be understood that the construction of sealing ring 74B will cause greater displacement of flexible sealing ring 48 from angular misalignment of hub 88 than will the construction of sealing ring 20A in coupling half 12 because the flexible ring 48 is spaced farther from teeth 26 in coupling half 14.

From the foregoing, it can be seen that a hub 16 may be placed within a sleeve 18 and, with sleeve 18 resting horizontally upon flange 42, the space between hub 16 and sleeve 18 may be filled with lubricant and sealed permanently therein by securing sealing ring 20B to sleeve 18, resulting in a permanently sealed gear coupling, the advantages of which have been previously explained. The coupling half 12 may be connected to a mounting flange on a rigid hub on shaft 40 or to a mounting flange on a similar coupling half on shaft 40 to form a full coupling. Similarly, a permanently sealed coupling half may be provided by the construction of coupling half 14 which can be used with a rigid hub on shaft 22 or with a similar coupling half on shaft 22 to form a full coupling of the type of coupling half 14.

If desired, sleeves 18 and 76 may be provided with a conventional fill plug (not shown) through which lubricant may be added to the coupling in the event that lubricant should escape between the rings 48 and hub 16 or 88 such as from evaporation caused by overheating or other reasons.

Thus, having described the invention in its best embodiment and mode of operation, that which is desired to be claimed by Letters Patent is:

1. A permanently sealed gear coupling for connecting a pair of substantially coaxially aligned shafts comprising:

a hub means connected to one of said shafts and having radially extending external gear teeth thereon;

a sleeve means connected to the other of said shafts and surrounding said hub means and having radially extending internal gear teeth thereon in meshing engagement with said external gear teeth;

a first annular flange means formed integrally with an outer end of said sleeve means and defining a first annular space with said hub means adjacent on outer side of said external teeth;

a second annular flange means permanently secured to an inner end of said sleeve means and defining a second annular space with said hub means adjacent an inner side of said external teeth; and a flexible metallic sealing ring member seated in a groove in each of said flange means and closing said annular spaces for retaining lubricant between said flange means and between said hub means and said sleeve means, said second flange means including a cylindrical portion extending axially towards said inner side of said external teeth for positioning said flexible sealing ring member, seated in said groove therein, near said external teeth.

2. The coupling of claim 1 wherein:

said sleeve means includes an annular ring portion deformable into tight engagement with said second flange means for permanently securing said second flange means to said sleeve means.

3. The coupling of claim 2 wherein:

said external teeth are formed in an annular raised shoulder portion on said hub means, said shoulder portion including an annular recess for receiving an end portion of said cylindrical portion to position said flexible sealing ring member near said external teeth, said shoulder portion further including at least one axially extending opening therein for passage of said lubricant from one side of said shoulder portion to the other.

4. The coupling of claim 3 wherein:

said flexible metallic sealing ring members comprise coiled ring members having circumferentially overlapping coils.

5. The coupling of claim 4 wherein:

the top lands of said external teeth are axially arcuate for seating engagement with the bottom lands of said internal teeth to provide piloting of said hub means within said sleeve means.

6. The coupling of claim 5 further including:

second hub means, substantially identical to said hub means, connected to said other of said shafts; and second sleeve means, substantially identical to said sleeve means, surrounding said second hub means, said second sleeve means being connected to said sleeve means for connecting said sleeve means to said other of said shafts.

* * * * *